United States Patent [19]

Saxton et al.

[11] Patent Number: 5,474,754
[45] Date of Patent: Dec. 12, 1995

[54] PREPARATION OF AN ALUMINOSILICOTITANATE ISOMORPHOUS WITH ZEOLITE BETA

[75] Inventors: Robert J. Saxton, West Chester; John G. Zajacek, Devon, both of Pa.

[73] Assignee: ARCO Chemical Technology, L.P., Greenville, Del.

[21] Appl. No.: 290,659

[22] Filed: Aug. 15, 1994

[51] Int. Cl.⁶ ............................. C01B 39/06; C01B 39/08
[52] U.S. Cl. ..................... 423/705; 423/707; 423/713; 423/DIG. 27
[58] Field of Search ........................... 423/702, 704, 423/705, 707, 713, DIG. 27; 502/60

[56] References Cited

U.S. PATENT DOCUMENTS

| | | | |
|---|---|---|---|
| 4,410,501 | 10/1983 | Taramasso et al. | 423/713 |
| 4,560,542 | 12/1985 | Robson | 423/DIG. 27 |
| 4,650,656 | 3/1987 | Dwyer et al. | 423/705 |
| 4,666,692 | 5/1987 | Taramasso et al. | 423/705 |
| 4,827,068 | 5/1989 | Chen et al. | 585/408 |
| 4,847,055 | 7/1989 | Chu | 423/705 |
| 5,098,687 | 3/1992 | Skeels et al. | 423/715 |
| 5,233,097 | 8/1993 | Nemeth et al. | 568/803 |
| 5,271,761 | 12/1993 | Skeels et al. | 95/116 |
| 5,374,747 | 12/1994 | Saxton et al. | 502/60 |

FOREIGN PATENT DOCUMENTS

| | | |
|---|---|---|
| 0311983 | 10/1988 | European Pat. Off. . |
| 0311903 | 4/1989 | European Pat. Off. ............. 502/60 |
| 2037596 | 7/1991 | Spain . |
| 9402245 | 2/1994 | WIPO . |

OTHER PUBLICATIONS

"Synthesis of Iitanoaluminosilicates Tsomorphous to Zeolite Beta Active As Oxidation Catalysts"–*Zedites*, Feb. 1993, vol. 13, Camblor et al.

"Synthesis of Titanium Silicalite–1 From an $SiO_2$–$TiO_2$ Cogel Using a Wetness Impregnation Method"–*J. Chem. Soc., Chem. Commun*, 1994, Uguina et al. (No Month).

"Activity of Ti–Beta Catalyst for the Selective Oxidation of Alkenes & Alkanes" *Journal of Catalysis*, 145, 1994, Corma et al. (No Month).

"Synthesis & Physiochemical Properties of Zeoites Containing Framework Titanium", Dartt et al., *Symposium on Chemically Modified Molecular Sieves*, Aug. 1943.

"Chemical Communications"–*Journal of the Chemical Society*, No. 8, 1992 Camblor et al. (No Month).

*Primary Examiner*—Mark L. Bell
*Assistant Examiner*—David Sample
*Attorney, Agent, or Firm*—Stephen D. Harper

[57] ABSTRACT

Aluminosilicotitanates having a framework structure isomorphous with zeolite beta are prepared by heating a solid amorphous $SiO_2$—$TiO_2$—$Al_2O_3$ cogel which has been impregnated with a quaternary tetraethyl ammonium species. The aluminosilicotitanates, which are useful oxidation catalysts, are obtained in high yield using a minimum quantity of template.

15 Claims, No Drawings

PREPARATION OF AN ALUMINOSILICOTITANATE ISOMORPHOUS WITH ZEOLITE BETA

FIELD OF THE INVENTION

This invention pertains to high yield methods for synthesizing molecular sieves isomorphous with zeolite beta which have aluminum, silicon, and titanium atoms in their framework structures.

BACKGROUND OF THE INVENTION

In recent years, the preparation of crystalline molecular sieves containing framework titanium atoms has received considerable attention due to the fact that such materials are active catalysts for the oxidation of organic substrates. For example, the isomorphous substitution of Si by Ti in a zeolite beta framework by direct hydrothermal synthesis has been reported [Camblor et al., *J. Chem. Soc., Chem. Commun.* 8, 589–590 (1992); Camblor et al., *Zeolites*, 13, 82–87 (1993); Corma et al., *J. Catalysis*, 145, 151–158 (1994); ES 2,037,596 (Camblor et al.)]. The higher activity of such materials as catalysts for the oxidation of bulkier molecules as compared to TS-1 (which is isomorphous with ZSM-5) is attributed to the larger pore size of the zeolite beta structure. Unfortunately, the direct hydrothermal synthesis of aluminosilicotitanates having a zeolite beta structure suffers from a number of drawbacks, including very low yields and the need to use a relatively large quantity of template and water. The development of improved methods for obtaining such catalysts would be highly desirable.

The preparation of molecular sieves containing titanium, silicon, and aluminum atoms in their framework structures is recognized as a highly uncertain and unpredictable art. For example, while European Pat. Publication No. 77,522 claimed the preparation of titano-aluminosilicates having a pentasil (ZSM-5) structure, later workers (Skeels et al.: U.S. Pat. No. 5,098,687) demonstrated that the titanium atoms in the materials obtained were not actually present in the form of a framework tetrahedral oxide. Similarly, although U.S. Pat. No. 4,410,501 contains an example wherein aluminum was allegedly added to a titanium silicate, Skeels et al. subsequently showed that what was actually produced was ZSM-5, not a titano-aluminosilicate having titanium incorporated into the aluminosilicate lattice. As observed in a recent publication [Tuel et al., *J. Chem. Soc., Chem. Commun.* 1667–1668 (1994)], "the synthesis of Ti-containing materials is relatively difficult."

SUMMARY OF THE INVENTION

This invention provides a method of making a crystalline aluminosilicotitanate having a framework structure isomorphous to zeolite beta comprising:

(a) reacting a hydrolyzable silicon compound, a hydrolyzable titanium compound, and a hydrolyzable aluminum compound with water under acidic conditions to form a solubilized partial hydrozylate characterized by the absence of precipitated silicon dioxide and titanium dioxide;

(b) contacting the solubilized partial hydrozylate with an amount of a quaternary tetraethyl ammonium species effective to catalyze further hydrolysis and to form a solid amorphous $SiO_2$—$TiO_2$—$Al_2O_3$ cogel;

(c) contacting the solid amorphous $SiO_2$—$TiO_2$—$Al_2O_3$ cogel with a solution of the quaternary tetraethyl ammonium species in a solvent to form an impregnated cogel, wherein the total amount of quaternary tetraethyl ammonium species in steps (b) and (c) is within 50% (more preferably, 20%) of the amount needed to completely occupy the pore volume of the solid amorphous $SiO_2$—$TiO_2$—$Al_2O_3$ cogel and the amount of solvent is sufficient to dissolve the quaternary tetramethyl ammonium species without forming a slurry of the impregnated cogel in said solvent; and (d) heating the impregnated cogel at a temperature of from 120° C. to 160° C. for a time sufficient to form the crystalline aluminosilicotitanate, The crystalline aluminosilicotitanate, which is obtained in high yield (e.g., >80%) using a minimum quantity of template, has been found to have favorably high activity as an oxidation catalyst.

DETAILED DESCRIPTION OF THE INVENTION:

In one step of the process of this invention, a solubilized partial hydrozylate is generated by reacting a hydrolyzable silicon compound, a hydrolyzable titanium compound, and a hydrolyzable aluminum compound with water under acidic conditions. "Hydrolyzable" in this context means that the compound is capable of functioning as a source of the $SiO_2$, $TiO_2$, or $Al_2O_3$ moieties in the framework of the crystalline aluminosilicotitanate product upon reaction with water. Although such hydrolysis reaction may be performed in any order, it is highly preferred to first contact the hydrolyzable silicon compound with water prior to hydrolysis of the other reactants. More preferably, the hydrolyzable silicon compound is first reacted, followed by the hydrolyzable aluminum compound, and then the hydrolyzable titanium compound.

The hydrolyzable silicon compound may be any substance capable of functioning as a source of $SiO_2$ (silica) including, for example, amorphous silica or, more preferably, a tetralkoxysilane such as tetraethyl orthosilicate or the like. Suitable hydrolyzable titanium compounds are those species which serve as a source of $TiO_2$ (titania) such as a titanium halide (e.g., $TiCl_4$) or, more preferably, a titanium alkoxide such as titanium tetrabutoxide or the like. The hydrolyzable aluminum compound may be any substance which is able to act as a source of $Al_2O_3$ (alumina). Such substances suitably include aluminum alkoxides and, more preferably, aluminum salts such as aluminum nitrate and the like.

The partial hydrolysis of the above-described reactants is catalyzed by an acidic catalyst such as, for example, a mineral acid or organic acid. Most preferably, a dilute (<0.2M) mineral acid such as hydrochloric acid is utilized. The partial hydrolysis may be carried out in any solvent capable of solubilizing the partial hydrolyzate which is formed. In a particularly desirable embodiment, water and/or a lower aliphatic alcohol such as ethanol or isopropanol is employed as a hydrolysis solvent. Hydrolysis temperatures are selected so as to achieve partial hydrolysis without over-hydrolysis, since over-hydrolysis will generate insoluble $SiO_2$, $TiO_2$, and/or $Al_2O_3$ species. Temperatures of from 0° C. to 50° C. are generally suitable for this purpose. The water is contacted with the aforedescribed reactants for a time (typically, from 0.5 to 12 hours) sufficient to form a solubilized partial hydrozylate which is characterized by the absence of precipitated silicon dioxide and titanium dioxide. Although the precise structure of the solubilized partial hydrozylate is not known, it is believed to comprise an extended network of Si, Ti, and Al atoms interconnected by bridging oxygen atoms which contains sufficient non-oxygen substituents on the Si, Ti, and Al atoms such as alkoxy groups and the like to render the network soluble in the hydrolysis medium.

The solubilized partial hydrozylate is thereafter treated with a catalytic amount of a quaternary tetraethyl ammonium species effective to accomplish further hydrolysis such that a solid amorphous $SiO_2$—$TiO_2$—$Al_2O_3$ cogel is formed. Sufficient quaternary tetraethyl ammonium species must be present to both neutralize the acid and to render the hydrolysis medium basic. The cogel generally precipitates from the hydrolysis medium and may be recovered by any suitable means such as filtration, centrifugation, decantation, or the like. The quaternary tetraethyl ammonium species may be a halide (e.g., Br), hydroxide, or the like. For reasons which are not fully understood, it has been found that the use of a quaternary tetraethyl ammonium species rather than another type of base such as ammonia is critical for the successful preparation of a crystalline aluminosilicotitanate having a zeolite beta structure. Hydrolysis of the solubilized partial hydrozylate leads to the formation of a solid amorphous $SiO_2$—$TiO_2$—$Al_2O_3$ cogel. The cogel may be taken on directly to template impregnation or, if so desired, may be separated from any remaining liquid components (e.g., solvent) by drying, filtration, or other such methods.

The solid cogel is contacted with a solution of the quaternary tetraethyl ammonium species (which functions as a template) in a solvent to form an impregnated cogel such that the template is preferably contained substantially within the pores of the cogel. The total amount of quaternary tetraethyl ammonium species in the hydrolysis and impregnation steps is within 50% (more preferably, 20%) of the amount needed to fill the available pore volume of the cogel. At the same time, the amount of solvent (which preferably is a polar species such as water and/or alcohol) is sufficient to dissolve the quaternary tetraethylammonium species but is not large enough to form a slurry of the cogel in said solvent (i.e., a free-flowing pumpable suspension of the cogel in the liquid solvent). Wetness impregnation techniques may be advantageously employed for such purpose. The solid cogel and quaternary tetramethyl ammonium species solution are contacted for a time and at a temperature sufficient to allow the template to enter the cogel pores (typically, 0.25 hours to 24 hours at 0° C. to 50° C.). The impregnated cogel is then heated at a temperature of from 120° C. to 160° (more preferably, 130° C. to 140°) for a time effective to form the desired crystalline aluminosilicotitanate. Generally speaking, from 1 to 7 days will be sufficient to provide high yields of product. It is preferred that the impregnated cogel not be stirred or otherwise agitated during heating.

The crystalline product may, if so desired, be calcined in air or the like at a temperature in excess of 400° C. in order to remove the tetraethylammonium cations still present as template within the aluminosilicotitanate. The calcined product will typically be protonated (i.e., it will contain hydrogen cations). If a catalyst with reduced acidity is preferred, the $H^+$ cations may be exchanged with an alkali metal or alkaline earth metal using any suitable method such as, for example, washing with an aqueous solution of a basic alkali metal or alkaline earth metal compound such as sodium acetate. Neutralization of the acidic sites on the aluminosilicotitanate will be especially desirable where the zeolite is to be used as an olefin epoxidation catalyst. Silylation, which may be accomplished, for example, by reacting the aluminosilicotitanate with chlorotrimethylsilane, may also be useful for this purpose.

Prior to, or subsequent to, calcination, the aluminosilicotitanate may be washed with water, hydrogen peroxide, and/or acid to remove impurities, enhance the catalytic activity or selectivity, and the like.

The relative proportions of the various reactants used to prepare the impregnated cogel may be varied as desired so as to favorably influence the elemental composition of the final crystalline aluminosilicotitanate. The composition of the impregnated cogel in terms of molar ratios may be as follows:

$SiO_2/TiO_2$ 5–200, preferably 10–100

$SiO_2/Al_2O_3$ 5–2000, preferably 30–800

$OH^-/SiO_2$ 0.02–1, preferably 0.05–0.6

$H_2O/SiO_2$ 0.1–10, preferably 1–5

$M^+/SiO_2$ 0–0.5, preferably ca.0

$TEA^+/SiO_2$ 0.01–2.0, preferably 0.05–1.0 where $M^+$ is an alkali metal cation such as $Na^+$ or $K^+$, which could be added as a hydroxide or salt (e.g., chloride) and/or as sodium aluminate (preferably, no alkali metal cation is purposefully added). $TEA^+$ represents the tetraethyl ammonium cation derived from the template.

The empirical formula for the aluminosilicotitanates synthesized by this method (in anhydrous form after calcination) preferably comprises:

$$SiO_2:mAl_2O_3:yTiO_2$$

wherein m is in the range of from 0.005 to 0.2, and y is greater than 0 but less than or equal to 0.1. If so desired, the crystalline aluminosilicotitanate may be formed into a suitable physical shape (e.g., pellets, extrudates) by conventional zeolite processing techniques. The use of a binder may be advantageous.

Aluminosilicotitanates made in accordance with the process of this invention act as catalysts in selective oxidation reactions of organic compounds in which the oxidizing agent can be a peroxide such as hydrogen peroxide. Examples of such reactions include the oxidation of linear, branched or cyclic alkanes to alcohols and ketones, the hydroxylation of phenolic compounds, the epoxidation of olefins, and the ammoximation of ketones using ammonia and hydrogen peroxide.

EXAMPLE 1

Sixty grams of tetraethyl orthosilicate (0.228 mol) were treated with 1.0 grams of 0.05M HCl for two hours. No solids were observed after two hours, indicating that overhydrolysis to silica had not taken place. To the clear solution was added a solution of 0.36 g aluminum nitrate nonahydrate (0.46 mmol) in 80 ml absolute ethanol. The solution turned slightly opaque or translucent but no solid phase formed. After stirring the solution for 30 minutes, a solution of 3.56 g titanium tetrabutoxide (0.015 mol) in 30 ml isopropanol was added. The resultant clear solution containing the solubilized partial hydrozylate was stored at room temperature for two hours. After this time, 7.4 g of a 35% aqueous tetraethylammonium hydroxide solution was added dropwise. The solution turned more opaque and finally gelled to a solid after about 10 minutes. The solid amorphous $SiO_2$—$TiO_2$—$Al_2O_3$ cogel thereby formed was dried at 110° C. overnight. There was recovered 24.14 g of a fine, white, powdery solid. Using a large mortar and pestle, the solid was wetness impregnated with 20.07 g of a 35% aqueous solution of tetraethyl ammonium hydroxide to make a runny gel of impregnated cogel. The molar composition of the impregnated cogel was as follows:

$SiO_2/Al_2O_3=110$ $SiO_2/TiO_2=27.5$ $H_2O/OH=11.1$ $OH/SiO_2=0.23$

The impregnated cogel was loaded into a teflon-lined Parr reactor and heated static at 135° for three days. The aluminosilicaotitanate product, obtained in greater than 95% yield, exhibited an XRD pattern characteristic of 100% crystalline beta zeolite with peaks somewhat sharper than usual. No amorphous material was detected by XRD. The as-synthesized product was examined by thermal analysis (TGA). A weight loss of 21.0% was observed at 800° C. (5° C./min.). DSC analysis exhibited an exotherm centered at 408° C. The organic template was removed by calcination at 550° C. using a temperature program of 1° C./minute for 6 hours. XRD analysis indicated no loss of crystallinity upon calcination. Chemical analysis of the calcined product indicated the following composition:

41% $SiO_2$ 0.11% $Al_2O_3$ 2.3% $TiO_2$ 0.04% $Na_2O$

<0.02% $K_2O$ $SiO_2/Al_2O_3=92$ $SiO_2/TiO_2=28$ $N_2$ BET analysis of the calcined product showed a micropore volume of 0.22 cc/g with a surface area of 503 m$^2$/g. A pronounced absorbance band was visible at 952 cm$^{-1}$ in the IR spectrum. Raman analysis confirmed the lack of anatase and rutile in the bulk sample. Diffuse reflectance UV-visible spectroscopy of a freshly calcined sample showed a major absorbance band at 215 nm with a second small peak at 230 nm.

COMPARATIVE EXAMPLE 2

The procedure described in Camblor et al., *J. Chem Soc., Chem, Commun.* 8,589–590 (1990) was followed to provide a gel having the following molar composition: $SiO_2$ 150, $TiO_2$ 49, $Al_2O_3$ 1, TEAOH 8, $H_2O$ 2300. In contrast to the process described and claimed herein, which gives very high yields of crystalline aluminosilicotitanate, less than a 10% yield of product was obtained after 56 hours using the prior art procedure.

We claim:

1. A method of making a crystalline aluminosilicotitanate having a framework structure isomorphous to zeolite beta comprising:

(a) reacting a hydrolyzable silicon compound, a hydrolyzable titanium compound, and a hydrolyzable aluminum compound with water under acidic conditions to form a solubilized partial hydrozylate characterized by the absence of precipitated silicon dioxide and titanium dioxide;

(b) contacting the solubilized partial hydrozylate with an amount of a quaternary tetraethyl ammonium species effective to catalyze further hydrolysis to form a solid amorphous $SiO_2$—$TiO_2$—$Al_2O_3$ cogel;

(c) contacting the solid amorphous $SiO_2$—$TiO_2$—$Al_2O_3$ cogel with a solution of the quaternary tetraethyl ammonium species in a solvent to form an impregnated cogel, wherein the total amount of quaternary tetraethyl ammonium species in steps (b) and (c) is within 50% of the amount needed to occupy the pore volume of the solid amorphous $SiO_2$—$TiO_2$—$Al_2O_3$ cogel and the amount of solvent is sufficient to dissolve the quaternary tetraethyl ammonium species without forming a slurry of the impregnated cogel in said solvent; and (d) heating the impregnated cogel at a temperature of from 120° C. to 160° C. for a time sufficient to form the crystalline aluminosilicotitanate.

2. The method of claim 1 wherein the crystalline aluminosilicotitanate is calcined following step (d).

3. The method of claim 1 wherein the hydrolyzable silicon compound is a tetraalkyl orthosilicate.

4. The method of claim 1 wherein the hydrolyzable titanium compound is a titanium tetraalkoxide.

5. The method of claim 1 wherein the hydrolyzable aluminum compound is an aluminum salt.

6. The method of claim 1 wherein step (a) is performed by (i) first forming a reaction mixture comprised of water and the hydrolyzable silicon compound, (ii) then adding the hydrolyzable aluminum compound to the reaction mixture, and subsequently adding the hydrolyzable titanium compound to the reaction mixture.

7. The method of claim 1 wherein the impregnated cogel has a composition expressed in terms of molar ratios within the following ranges:

$SiO_2/TiO_2$ 10–100

$SiO_2/Al_2O_3$ 30–800

$X^-/SiO_2$ 0.05–0.6

$H_2O/SiO_2$ 1–5

$M^+/SiO_2$ <0.5

$TEA^+/SiO_2$ 0.05–1.0 wherein $M^+$ is an alkali metal cation, $TEA^+$ is the tetraethyl ammonium cation, and $X^-$ is the counter anion present in the quaternary tetraethyl ammonium species.

8. The method of claim 1 wherein the quaternary tetraethyl ammonium species is tetraethyl ammonium hydroxide.

9. The method of claim 1 wherein the crystalline aluminosilicotitanate is calcined and the calcined crystalline aluminosilicotitanate comprises the empirical formula $$SiO_2:mAl_2O_3:yTiO_2$$

wherein m is from 0.005 to 0.2, and y is greater than zero and less than or equal to 0.1.

10. A method of making a crystalline aluminosilicotitanate having a framework structure isomorphous to zeolite beta comprising:

(a) reacting a tetraalkyl orthosilicate, a titanium alkoxide, and an aluminum salt with water under acidic conditions to form a solubilized partial hydrozylate characterized by the absence of precipitated silicon dioxide and titanium dioxide;

(b) contacting the solubilized partial hydrozylate with an amount of quaternary tetraethyl ammonium species effective to catalyze further hydrolysis to form a solid amorphous $SiO_2$—$TiO_2$—$Al_2O_3$ cogel;

(c) contacting the solid amorphous $SiO_2$—$TiO_2$—$Al_2O_3$ cogel with a solution of the quaternary tetraethyl ammonium species in a solvent to form an impregnated cogel, wherein the total amount of quaternary tetraethyl ammonium species in steps (b) and (c) is within 20% of the amount needed to occupy the pore volume of the solid amorphous $SiO_2$—$TiO_2$—$Al_2O_3$ cogel and the amount of solvent is sufficient to dissolve the quaternary tetraethyl ammonium species without forming a slurry of the impregnated cogel in said solvent;

(d) heating the impregnated cogel at a temperature of from 130° C. to 140° C. for a time sufficient to form the crystalline aluminosilicotitanate; and (e) calcining the crystalline aluminosilicotitanate at a temperature greater than 400° C.;

wherein the amounts of tetraalkyl orthosilicate, titanium alkoxide, aluminum salt, and quaternary tetraethyl ammonium species are selected such that the impregnated cogel has a composition expressed in terms of molar ratios within the following ranges:

$SiO_2/TiO_2$ 10–100

$SiO_2/Al_2O_3$ 30–800

$X^-/SiO_2$ 0.05–0.6

$H_2O/SiO_2$ 1–5

$M^+/SiO_2$ <0.5

$TEA^+/SiO_2$ 0.05–1.0 wherein $M^+$ is an alkali metal cation, $TEA^+$ is the tetraethyl ammonium cation, and $X^-$ is the counter anion present in the quaternary tetraethyl ammonium species.

11. The method of claim 10 wherein the tetraalkyl orthosilicate is tetraethyl orthosilicate.

12. The method of claim 10 wherein the titanium alkoxide is titanium tetrabutoxide.

13. The method of claim 10 wherein the aluminum salt is aluminum nitrate.

14. The method of claim 10 wherein the quaternary tetraethyl ammonium species is tetraethyl ammonium hydroxide.

15. The method of claim 10 wherein the solvent is selected from the group consisting of water and $C_1$–$C_6$ aliphatic alcohols.

* * * * *